(12) United States Patent
Irie et al.

(10) Patent No.: US 10,757,300 B2
(45) Date of Patent: Aug. 25, 2020

(54) CAMERA HOUSING AND IMAGING METHOD

(71) Applicant: Toray Industries, Inc., Tokyo (JP)

(72) Inventors: Kei Irie, Otsu (JP); Hisashi Kobayashi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 3 days.

(21) Appl. No.: 16/072,723

(22) PCT Filed: Jan. 27, 2016

(86) PCT No.: PCT/JP2016/052348
§ 371 (c)(1),
(2) Date: Jul. 25, 2018

(87) PCT Pub. No.: WO2017/130328
PCT Pub. Date: Aug. 3, 2017

(65) Prior Publication Data
US 2019/0037113 A1  Jan. 31, 2019

(51) Int. Cl.
*H04N 5/225* (2006.01)
*G02B 27/00* (2006.01)
(Continued)

(52) U.S. Cl.
CPC ............. *H04N 5/2252* (2013.01); *G02B 7/02* (2013.01); *G02B 27/0006* (2013.01);
(Continued)

(58) Field of Classification Search
CPC .... H04N 5/2252; H04N 5/2254; H04N 5/225; G02B 27/4277; G02B 7/02; G02B 27/0006; G03B 17/08; G03B 17/568
(Continued)

(56) References Cited

U.S. PATENT DOCUMENTS

2012/0070142 A1*  3/2012  Tregnago ................ B60R 11/04
                                                    396/419
2014/0341607 A1* 11/2014  Nakano .............. G03G 15/2017
                                                    399/92
2017/0028936 A1   2/2017  Matsumoto

FOREIGN PATENT DOCUMENTS

JP      06167670 A      6/1994
JP      06167760 A      6/1994
(Continued)

OTHER PUBLICATIONS

International Search Report and Written Opinion for International Application No. PCT/JP2016/052348, dated Apr. 19, 2016—6 pages.

*Primary Examiner* — Lin Ye
*Assistant Examiner* — Chan T Nguyen
(74) *Attorney, Agent, or Firm* — RatnerPrestia

(57) ABSTRACT

A camera housing is provided which prevents dust and mist from adhering to a camera lens and which makes it possible to secure clear imaging despite continuous use. The camera housing comprises a front portion provided at a position opposite of the lens surface of an internally provided camera lens, a rear portion provided at a position opposite of the front portion, and another side portion. The front portion has an opening, and the rear portion and/or side portion has an air ejection port. The diameter of the inscribed circle of the opening is 0.9 time or less the diameter of the inscribed circle of the front portion, and the area of the air ejection port is 0.1 time or more the area of the opening.

1 Claim, 4 Drawing Sheets

(51) Int. Cl.
*G03B 17/08* (2006.01)
*G03B 17/56* (2006.01)
*G02B 7/02* (2006.01)
*G02B 27/42* (2006.01)

(52) U.S. Cl.
CPC ......... *G02B 27/4277* (2013.01); *G03B 17/08* (2013.01); *G03B 17/56* (2013.01); *H04N 5/225* (2013.01); *H04N 5/2254* (2013.01)

(58) Field of Classification Search
USPC .................................................. 348/373–375
See application file for complete search history.

(56) References Cited

FOREIGN PATENT DOCUMENTS

| | | | | |
|---|---|---|---|---|
| JP | H06167670 | * | 6/1994 | ............. G02B 27/00 |
| JP | 1039389 | A | 2/1998 | |
| JP | 2001108880 | A | 4/2001 | |
| JP | 2003232975 | A | 8/2003 | |
| JP | 2006235061 | A | 9/2006 | |
| JP | 2015101250 | A | 6/2015 | |

* cited by examiner (1-a)

(1-b)

(1-c)

Flow speed (m/s)

Flow speed (m/s)

Flow speed (m/s)

CAMERA HOUSING AND IMAGING METHOD

CROSS REFERENCE TO RELATED APPLICATIONS

This is the U.S. National Phase application of PCT/JP2016/052348, filed Jan. 27, 2016, the disclosure of this application being incorporated herein by reference in its entirety for all purposes.

TECHNICAL FIELD OF THE INVENTION

The present invention relates to a camera housing that prevents dust and mist from adhering to a camera lens under an environment where dust and mist are generated.

BACKGROUND OF THE INVENTION

In recent years, camera devices such as video cameras are used for various purposes. For example, they are used at home and at business especially for monitoring purpose and for recording and observation purposes at a production site. And the installation place of the camera devices used for the above purpose has places where people are unable to approach such as high place or narrow place or a place human body is adversely affected. Therefore, once the camera device installed, maintenance free is desirable. On the other hand, in places described above, dust, mist are scattered, and it is necessary to protect the camera device with dust proof camera housing from dust and mist.

Therefore, as a conventional dust proof camera housing, for example, an opening is provided in front of a camera lens and an air ejection port is provided in a wall of a camera housing at a position behind a camera, and air ejected from the air ejection port is ejected from the opening to the outside of the camera housing, thereby preventing dust and the like from adhering to the camera lens (Patent document 1).

Further, another one is also known which is consisted of a camera housing provided with a transparent partition plate in front of a camera lens, and an air passage formed in front of the partition plate which is directed along the wall surface of the partition plate toward the center of the partition plate from the periphery, and an air passage configured so as to blow off dust which is coming toward the partition plate, and air from an air supply to the air passages (Patent document 2).

Furthermore, another one is also known which is consisted of a transparent partition plate in front of a camera lens, and dust and mist adhering to the front surface of the transparent plate is wiped by a device such as a wiper (Patent document 3).

PATENT DOCUMENTS

Patent document 1: JP-A-6-167760
Patent document 2: JP-A-2001-108880
Patent document 3: JP-A-2006-235061

SUMMARY OF THE INVENTION

However, according to the technology of Patent document 1, there is a problem that the camera device vibrates depending upon the flow speed of the air ejected from the air ejection port provided on the wall of the camera housing at a position behind the camera, and the image shot by the camera device will be blurred. On the other hand, if flow speed is reduced in order to prevent vibration of the camera device, flow speed of air ejected from the opening to the outside of the camera housing becomes slow. As a result, there may be a problem that scattering dust or mist gets inside of the housing and adheres to the surface of the camera lens. This causes not only a clear image cannot be captured, but also the camera device breaks down because of the mist.

Furthermore, if the air ejection port behind the camera is provided at a position where the air flow does not directly hit the back of camera device, the ejection speed at the opening becomes non-uniform. As a result, some part where the ejection flow speed is faster than the other part becomes lower pressure than the other part. It causes a problem that flow involving dust and mist from outside of camera housing into inside occurs at that part and dust and mist get inside of camera housing.

In the technology of Patent document 2, in the air passage formed in front of the partition plate so as to be directed along the wall surface of the partition plate toward the center of the partition plate from the periphery, a flow that is also directed forward of the partition plate is formed. Therefore, the supplied air has a smaller velocity at the center of the partition plate, and the air collided on the optical axis of the camera lens moves away from the front side of the partition plate and the air moving to the front side and the air returning to the rear side are generated, and the air moving rearward involves mist being scattered around and makes the mist adhere to the partition plate. For this reason, it is impossible to secure a clear image and the partition plate needs to be cleaned periodically.

In the technology of Patent Document 3, if the wiper is operated at a state where dust or mist is adhered to the transparent plate, the transparent plate rather becomes dirty, and the wiper must be periodically replaced.

As described above, in the conventional camera housings, dust or mist adheres to the camera lens or the transparent partition plate under the environment where dust or mist is generated, and it is impossible to keep the images to be clear. It is an object of the present invention to provide a camera housing which enables to secure a clear image without dust or mist sticking to a camera lens and continuously usable.

To achieve the above-described object, a camera housing of the present invention comprises a front portion provided at a position opposite of a lens surface of an internally provided camera lens, a rear portion provided at a position opposite of the front portion, and another side portion, the front portion has an opening, and the rear portion and/or the side portion has an air ejection port, wherein a diameter of an inscribed circle of the opening is 0.9 time or less a diameter of an inscribed circle of the front portion, and an area of the air ejection port is 0.1 time or more an area of the opening.

Furthermore, an imaging method according to the present invention is a method for imaging by using a camera device provided inside the above-described camera housing.

With the camera housing according to the present invention, even in the environment where dust or mist is generated, dust or mist does not adhere to the camera lens, and it becomes possible to secure a clear image continuously.

DETAILED DESCRIPTION OF EMBODIMENTS OF THE INVENTION

Hereinafter, embodiments of the present invention will be explained in detail referring to figures.

First Embodiment of the Present Invention

Figure 1:
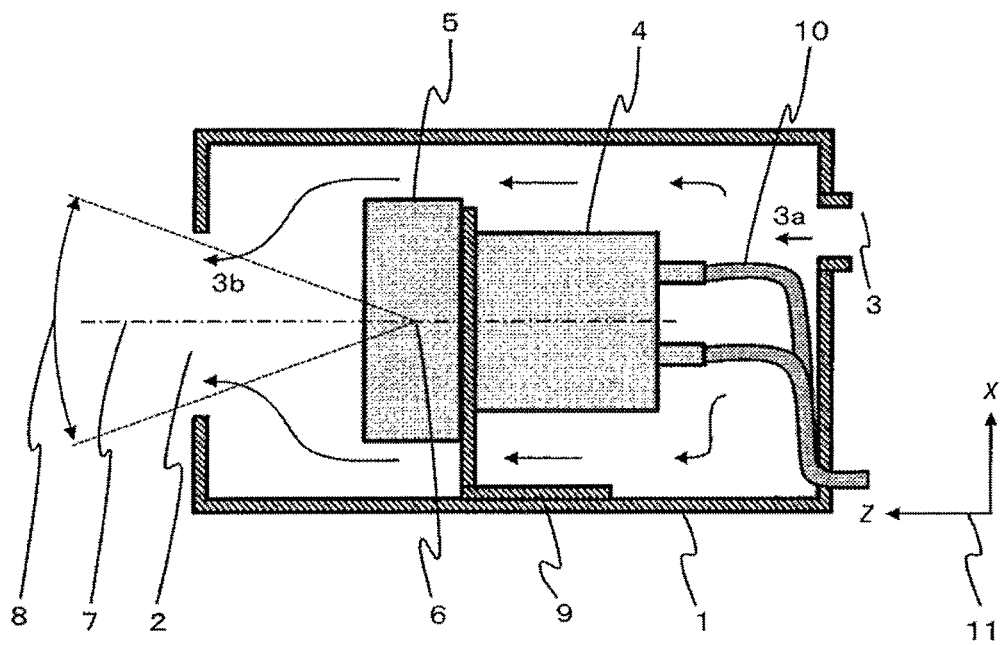
FIG. 1 is a cross-section view showing a schematic structure of a camera housing according to a first embodiment of the present invention.
Figure 2:
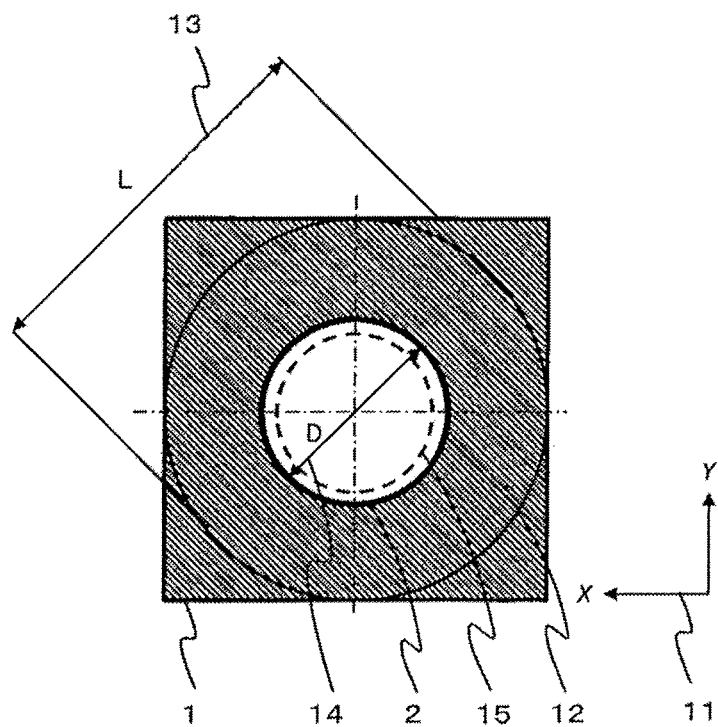
FIG. 2 is a front view of FIG. 1.

FIGS. 1 and 2 relate to an embodiment of the present invention, FIG. 1 is a cross-section view showing a schematic internal structure of a camera housing 1 and a camera 4 and a camera lens 5 provided inside the camera housing 1, and FIG. 2 is a front view of FIG. 1.

As shown in FIG. 1, the camera housing 1 of the present invention has a front portion provided at a position opposite of the lens surface of the camera lens 5 provided therein, a rear portion provided at a position opposite of the front portion, and another side portion, an opening 2 is provided at the front portion of the camera housing 1, and an air ejection port 3 is provided at the rear portion and/or side portion of the camera housing 1. "Camera housing" is a case for protecting the entire camera device provided inside from dust, mist and such scattered matter around the camera device.

The opening 2 is provided in the front portion of the camera housing 1. Further, the front portion of the camera housing 1 and the plane including the opening 2 are referred to as "opening plane". Furthermore, as shown in FIG. 1, in the present invention, the thickness of the opening 2 is same as the thickness of the front portion of the camera housing 1.

Here, it is preferable that the shape of the camera housing 1 as viewed from the front portion side is an axis symmetry shape with respect to an optical axis 7 as shown in FIG. 2. Because, to realize that air 3b ejected from the opening 2 to the outside of the camera housing 1 has no bias in the ejection speed at the opening 2 and the uniform ejection air can be formed, it is preferable that the flow path inside the camera housing 1 is also in an axis symmetry condition with respect to the optical axis 7. Here, as shown in FIG. 1, the optical axis 7 means a straight line passing through the center of the camera lens 5, and is the same as the rotationally symmetric axis of the camera lens 5.

Here, the dimensions of the camera housing 1, the opening 2, and the air ejection port 3 satisfy the following relationships. That is, the diameter of the inscribed circle of the opening 2 is 0.9 time or less the diameter of the inscribed circle of the front portion of the camera housing 1, and the area of the air ejection port is 0.1 time or more the area of the opening.

Since the flow rate of the air 3a ejected from the air ejection port 3 into the camera housing 1 and the flow rate of the ejected air 3b ejected from the opening 2 to the outside of the camera housing 1 are equal to each other, if the area of the opening 2 is increased, the flow speed of the ejected air 3b at the opening 2 becomes small, and dust or mist scattered outside the camera housing 1 may enter the inside of the camera housing 1 from the opening 2.

Therefore, with respect to the relationship between the opening 2 and the camera housing 1, when assuming as shown in FIG. 2 that the diameter of the inscribed circle of the opening 2 is D and the diameter of the inscribed circle of the front portion is L, the relationship of D/L is set at 0.9 or less. This is because, when D/L is 0.9 or less, there is no inflow of dust and mist scattered outside the camera housing 1 at the opening 2, and uniform ejected air 3b can be obtained.

Here, in the case of the camera lens 5 having an axis symmetry with respect to the optical axis 7, it is most preferable that the shape of the opening 2 is a circle centered on the same optical axis 7 as the area formed by angle of view 15. In the case where the relationship between the diameter D of the inscribed circle of the opening 2 and the diameter L of the inscribed circle of the front portion is D/L=0.9 or less, the shape of the opening 2 is not limited to be a circle, and it may be a polygon such as a square or a hexagon or an elliptical shape. The "area formed by angle of view" is a cross-section area obtained by cutting a conical area obtained by rotating the side including the angle of view with the focal point 6 as the vertex around the optical axis 7, with the plane of the opening 2, and as shown in FIG. 2, it is a circular range centered on the optical axis 7.

Assuming that the area of the opening 2 is $S_{out}$ and the area of the air ejection port 3 is $S_{in}$, with respect to the relationship between the opening 2 and the air ejection port 3, a range capable of obtaining a uniform ejected air at the opening 2 is a case of $S_{in}/S_{out}=0.1$ time or more. In case where the area of the air ejection port 3 is small and the flow speed of air colliding with the camera device or the inner wall surface of the camera housing 1 exceeds 10 m/s, vibration of the camera device may occur. However, by increasing the area of the air ejection port 3 so that the speed of the air 3a becomes 10 m/s or less, while securing the flow rate of the air 3a ejected from the air ejection port 3 into the camera housing 1, the vibration of the camera device can be suppressed.

Therefore, by setting so that the diameter of the inscribed circle of the opening 2 is 0.9 time or less the diameter of the inscribed circle of the front portion of the camera housing 1 and the area of the area of the air ejection port 3 provided in the rear portion and/or the side portion of the camera housing 1 is 0.1 time or more the area of the opening 2, it is possible to prevent dust and mist scattered outside the camera housing 1 from entering the inside of the camera housing 1 from the opening 2 and to suppress the vibration of the camera device.

The air ejection port 3 is connected to an air generation means such as a pump or a compressor not shown in FIG. 1 through piping or the like. The air 3a ejected from the air ejection opening 3 into the camera housing 1 is ejected from the opening 2 to the outside of the camera housing 1. Where, as the "air" in the present invention, air having a constant density or the like can be used.

Inside the camera housing 1, as shown in FIG. 1, a camera device comprising the camera 4 and the camera lens 5 is fixed via a fixing jig 9, and imaging of an object is to be imaged through the opening 2. Further, it is connected to an image display device (not shown) via cables 10 connected to the camera device, which captures a signal imaged by the imaging device. Here, the cables are a power supply cable and a camera signal cable. The fixing jig 9 consists of mechanical parts for fixing the camera device and the camera housing, and in addition to the embodiment shown in FIG. 1, it is possible to have an embodiment wherein the camera device is fixed to the rear wall of the camera housing.

Second Embodiment of the Present Invention

Figure 3:
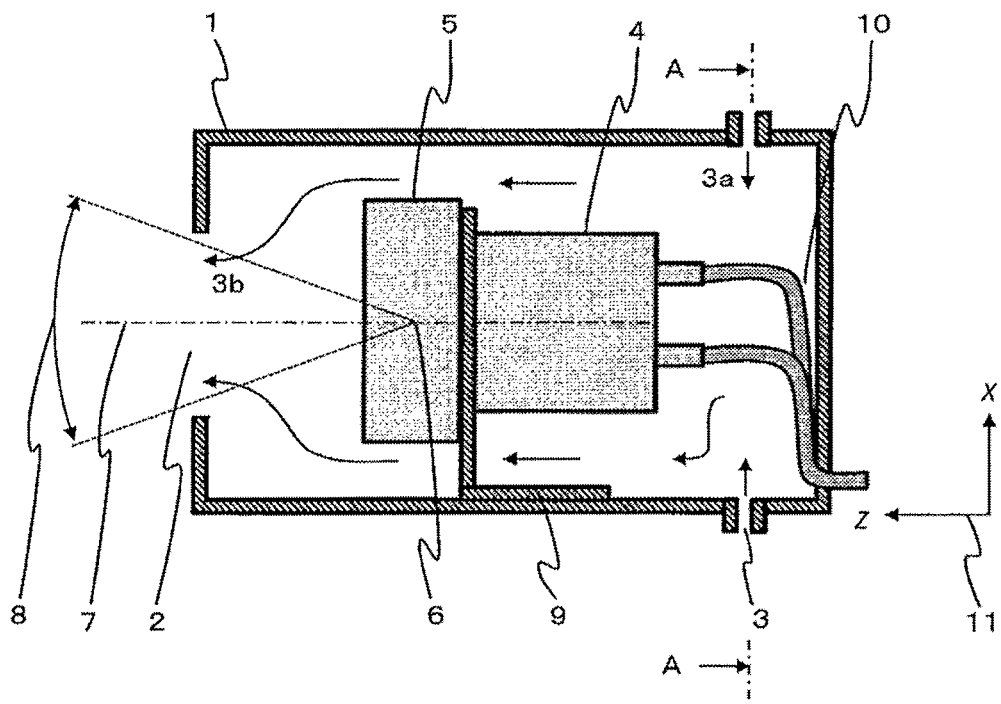
FIG. 3 is a cross-section view showing a schematic structure of a camera housing according to a second embodiment of the present invention.
Figure 4:
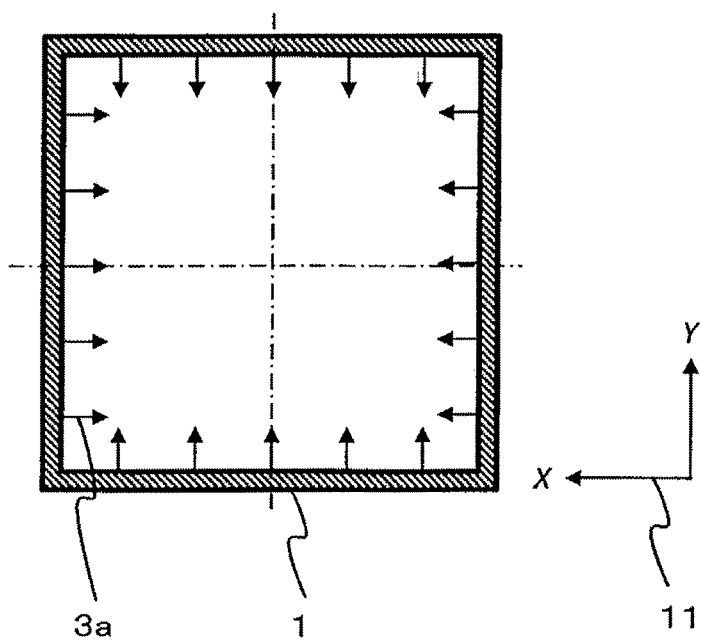
FIG. 4 is a cross-section view from the line A-A of FIG. 3.

According to the second embodiment of the present invention, in the first embodiment of the present invention described above, instead of the structure where the air ejection port 3 is provided in the rear portion and/or the side portion, as shown in FIGS. 3 and 4, it is provided over the entire circumference of the side portion of the camera housing 1. Other configurations are the same as those in the first embodiment.

FIG. 3 is a cross-section view showing a schematic internal structure of a camera housing 1 and a camera device or the like comprising a camera 4 and a camera lens 5 provided inside the camera housing 1 according to a second embodiment of the present invention. FIG. 4 is a cross-section view along line A-A in FIG. 3.

In order to form uniform ejected air, which means with a small speed difference of the ejection speed, at the opening 2, it is preferred that a flow going forward parallel to the optical axis 7 and perpendicular to the opening plane including the opening 2 is formed inside the camera housing 1. Accordingly, by providing the air ejection port 3 on the side portion of the camera housing 1 over the entire circumference of the side portion, the ejection air 3b with a constant flow speed from the air ejection port 3 axis-symmetric with respect to the optical axis 7 can be formed in the camera housing 1. As a result, more uniform ejection air can be formed compared to the case where the air ejection port 3 is provided in the rear portion and/or the side portion of the camera housing 1 as in the aforementioned first embodiment of the present invention. Here, the term "entire circumference" may be interpreted as being provided substantially over the entire circumference, and there may be possible to have a portion where there is partially no hole. Further, by providing the air ejection port 3 over the entire circumference of the side portion of the camera housing 1, it is possible to secure a large area of the air ejection port 3. Then even if the flow rate is increased, it is possible to prevent camera from being vibrated by hitting the air.

As the air ejection port 3, for example, a slit-shaped one provided over the entire circumference of the side portion of the camera housing 1 can be preferably employed. In the embodiment of the present invention, under a condition where the flow rate at the air ejection port is 0.008 m³/min, the width of the slit is preferably 2 mm or more, particularly in a range of 8 mm to 18 mm, so that it is possible to form uniform ejection air with a smaller difference in ejection speed at the opening 2. In case where the width of the slit exceeds 18 mm, the strength of the camera housing may decrease.

Third Embodiment of the Present Invention

The third embodiment of the present invention is characterized that in the second embodiment of the present invention described above the air ejection port 3 is provided closer to the opening 2 side than the lens surface of the camera lens 5.

In case where the air ejection port 3 is provided closer to the rear portion side than the lens surface of the camera lens 5 or in case where the air ejection port 3 is provided at a position where the ejected air 3a from the air ejection port 3 hits the side surface of the camera lens 5, a flow speed difference may occur in the ejected air 3b in the region of the opening 2, by being affected by the shape, material and attachment position of the fixing jig 9. For example, in the vicinity of the center of the opening 2, the flow speed of the ejected air 3b is fast, and the flow speed may decrease as it goes away from the center in the radial direction. Even if a flow that ejects to outside the camera housing 1 is formed within the range of the opening 2, in case where there is a large difference in the flow speed to be ejected, a vortex may be generated in a portion where the ejection flow speed is fast, and from a portion where the ejection flow speed is slow, a flow field flowing into the camera housing 1 may occur. Therefore, within the range of the opening 2, it is preferred that a flow ejecting toward the outside of the camera housing 1 is formed and the difference in its ejection flow speed is small. Here, "the side surface of the camera lens 5" indicates the part of the camera lens in which a zoom ring or a focus ring exists.

On the other hand, by employing the embodiment in which the position of the air ejection port 3 is provided closer to the opening 2 side than the lens surface of the camera lens 5, it is not affected by the shape, material and attachment position of the fixing jig 9, so it becomes possible to form more uniform ejected air 3b at the opening 2.

Further, by providing the air ejection port 3 on the side portion of the camera housing 1 at a position where the ejected air 3a from the air ejection port 3 flows toward the optical axis 7 along the lens surface of the camera lens 5, most uniform ejected air 3b can be formed in the opening 2. In order to form the uniform ejected air 3b in the opening 2, it is preferred that the flow is parallel to the optical axis 7 and perpendicular to the opening 2. For that purpose, by increasing the distance between the opening 2 and the plane provided with the air ejection port 3, thereby ensuring a long running distance so that a flow is formed from the air ejection port 3 perpendicularly to the opening 2, uniform ejected air 3b can be obtained in the opening 2.

The operation of the camera housing 1 configured as described above will be explained.

Figure 5:
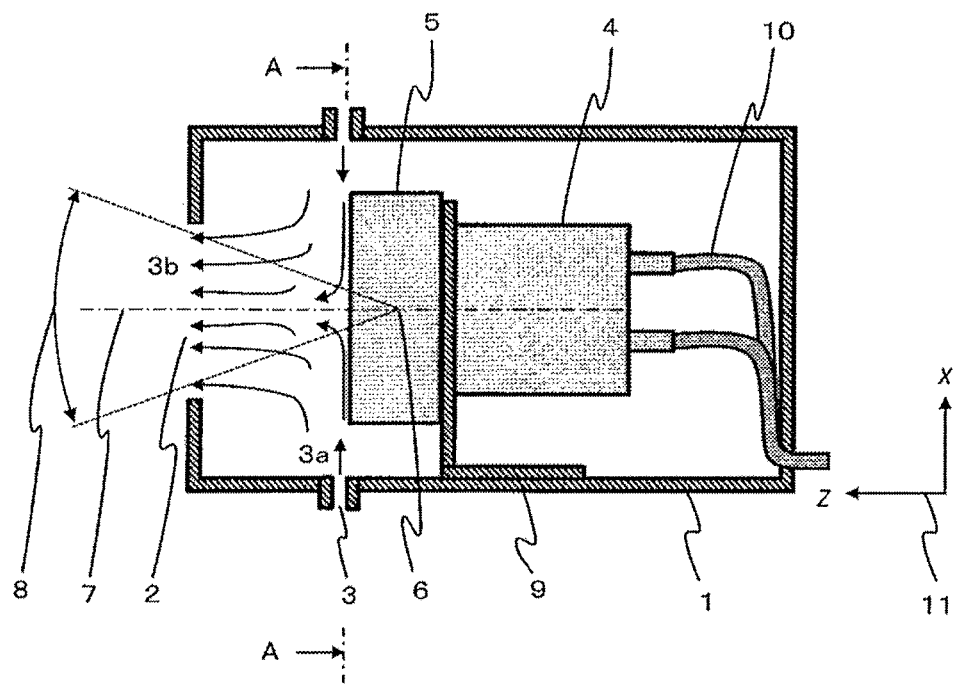
FIG. 5 is a cross-section view showing a schematic structure of a camera housing according to a third embodiment of the present invention.

As shown in FIG. 5, the air 3a ejected from the air ejection port 3 provided over the entire circumference of the side portion of the camera housing 1 into the camera housing 1 is guided along the lens surface of the camera lens 5 toward the optical axis 7, and airs collide with each other on the optical axis 7. Thereafter, flows advancing in the direction of the front portion and in the direction of the rear portion of the camera housing 1 are formed. Here, the flow advancing in the direction of the front portion of the camera housing 1 becomes a flow perpendicular to the plane having the opening portion 2, and is ejected from the opening 2 to the outside of the camera housing 1 to form the air 3b. On the other hand, the flow advancing to the rear portion of the camera housing 1 collides with the lens surface of the camera lens 5, and again becomes a flow advancing in the direction of the front portion of the camera housing 1. As a result, the ejected air 3b is efficiently formed, and a flow going outward from the opening 2 is formed at entire part of the opening 2. Therefore, it is possible to prevent dust and mist outside the camera housing 1 from getting inside the camera housing 1 through the opening 2 and adhering to the camera lens 5, and to secure clear images even if it is used continuously.

Camera devices used for monitoring outdoors where dust and the like are scattered and for recording in factories where mist and the like are scattered, it is required to constantly display clear images even under such a severe environments. Under such environments, conventionally it has been limited only to use for a short time, or installation place has been restricted, or regular cleaning of the camera device has been required. However, by using the camera device with the camera housing according to the present invention, it becomes possible to always ensure a clear image even under dust or mist scattering. As a result, in case of the camera device for the purpose of monitoring, the camera device can be installed under a further severe environment in which it could not be installed conventionally. Further, with respect to the camera device for recording at a factory, because a periodical maintenance becomes unnecessary, so that it is possible to always record and inspect a product which is continuously produced as a clear image without failing.

EXAMPLES

Regarding the camera housing according to the present invention, the velocity distribution of the ejected air at the opening was analyzed and its effectiveness was confirmed, and the examples thereof are shown in the following Examples 1 to 3. For the analysis, commercially available general-purpose fluid analysis software ("STAR-CCM+" supplied by CD Adapco Co., Ltd.) was used.

An analysis model with a camera housing and a camera and a camera lens provided inside the camera housing shown below was prepared. The flow field of the fluid was analyzed by dividing the opening into microelements on the analysis model and solving the physical equation with the microelements respectively. Here, "microelement" is called mesh, cell, calculation lattice and the like, and in case of three dimensions, it means tetrahedron, hexahedron, etc. Further, "fluid" indicates gas, and therefor, air with a constant pressure was used. The ejection flow speed was evaluated by the velocity component that advanced in a direction along the optical axis (z direction).

Example 1

As shown in FIG. 1, with respect to the first embodiment of the present invention, in the camera housing in which the diameter of the inscribed circle of the opening was 0.9 time or less the diameter of the inscribed circle of the front portion of the camera housing, and the area of the air ejection port provided in the wall of camera housing was 0.1 time or more the area of the opening, the speed distribution of the ejected air at the opening was analyzed, and one example is shown. In the ranges of D/L: 0.50-0.83 and $S_{in}/S_{out}$: 0.102-0.284, three conditions of (1-a), (1-b) and (1-c), in which the dimensions of the opening and the air ejection port were changed, were analyzed.

Outline of the camera housing, opening and air ejection port according to the present invention having been analyzed is summarized in Table 1.

TABLE 1

| | |
|---|---|
| Dimensions of camera housing | : 120 mm (X) × 120 mm (Y) × 250 mm (Z) |
| Dimensions of camera lens | : Φ65 mm × 50 mm (Z) |
| Focal length of camera lens | : 50 mm |
| Camera lens angle of view | : 44° |
| Dimensions of camera | : 60 mm (X) × 60 mm (Y) × 81 mm (Z) |
| Shape of opening | : circle |
| Distance between opening and lens | : 20 mm (The range of the angle of view at a position of 20 mm from the tip of the lens is Φ55 mm.) |
| Shape of air ejection port | : circle |
| Position of air ejection port | : rear portion of camera housing (optical axis: center) |

Figure 6:
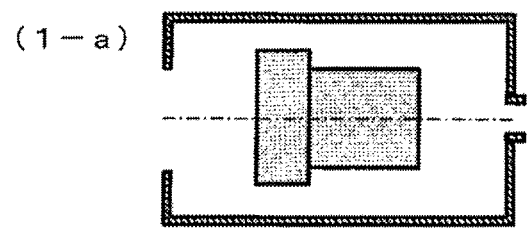
FIG. 6 shows diagrams of evaluation performed in Example 1.
Figure 6:
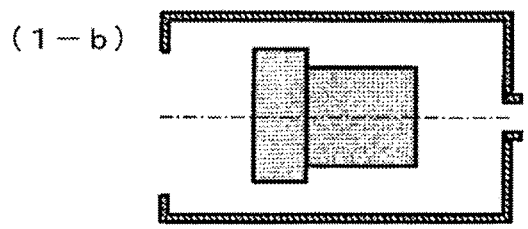
Figure 6:
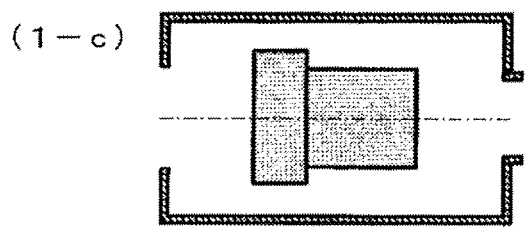

Further, FIG. 6 shows schematic cross-section views of the respective (1-a), (1-b) and (1-c).

Details of the analysis conditions are summarized in Table 2.

TABLE 2

| | | (1 - a) | (1 - b) | (1 - c) |
|---|---|---|---|---|
| Diameter of inscribed circle of front portion (L) | [mm] | 120.0 | 120.0 | 120.0 |
| Diameter of inscribed circle of opening (D) | [mm] | 60.0 | 100.0 | 60.0 |
| Area of opening ($S_{out}$) | [mm²] | 2827.4 | 7854.0 | 2827.4 |
| Position of air ejection port | [—] | rear portion (optical axis: center) | rear portion (optical axis: center) | rear portion (optical axis: center) |
| Area of air ejection port ($S_{in}$) | [mm²] | 804.2 | 804.2 | 5026.5 |
| D/L | [—] | 0.50 | 0.83 | 0.50 |
| $S_{in}/S_{out}$ | [—] | 0.284 | 0.102 | 1.778 |

The analysis results are shown in Table 3.

TABLE 3

| | | (1 - a) | (1 - b) | (1 - c) |
|---|---|---|---|---|
| Maximum value of ejection speed | [m/s] | 3.41 | 1.54 | 3.51 |
| Minimum value of ejection speed | [m/s] | 0.68 | 0.31 | 0.66 |
| Standard deviation of ejection speed | [—] | 0.55 | 0.30 | 0.56 |

TABLE 3-continued

|  |  | (1 - a) | (1 - b) | (1 - c) |
|---|---|---|---|---|
| Speed of air colliding with camera wall surface | [m/s] | 9.66 | 9.66 | 2.12 |

Note that the ejection speed at the opening is shown such as a positive value in the +z direction along the optical axis, and a negative value in the −z direction. If it is a positive value, it means an air flows from the inside of the camera housing to the outside, and if it is a negative value, it means an air flows into the camera housing. As shown in Table 3, in all results, the ejection speeds showed positive values, no air flowing into the camera housing occurred, and further, the speed of the air colliding with the wall of the camera was 10 m/s or less, and it was understood that there was no vibration of the camera.

Example 2

As shown in FIG. 3, with respect to the second embodiment of the present invention, the speed distribution of the ejected air at the opening of the camera housing having a configuration in which the air ejection port was provided over the entire circumference of the side portion of the camera housing was analyzed. Except for the shape and position of the air ejection port, it was the same as in (1-a) of Example 1.

Outline of the camera housing, opening, air ejection port according to the present invention having been analyzed is summarized in Table 4.

TABLE 4

| Dimensions of camera housing | : 120 mm (X) × 120 mm (Y) × 250 mm (Z) |
|---|---|
| Dimensions of camera lens | : Φ65 mm × 50 mm (Z) |
| Focal length of camera lens | : 50 mm |
| Camera lens angle of view | : 44° |
| Dimensions of camera | : 60 mm (X) × 60 mm (Y) × 81 mm (Z) |
| Shape of opening | : circle |
| Distance between opening and lens | : 20 mm (The range of the angle of view at a position of 20 mm from the tip of the lens is Φ55 mm.) |
| Shape of air ejection port | : slit shape provided over the entire circumference of side surface of camera housing |

Details of the analysis conditions are summarized in Table 5.

TABLE 5

| Diameter of inscribed circle of front portion (L) | [mm] | 120.0 |
|---|---|---|
| Diameter of inscribed circle of opening (D) | [mm] | 60.0 |
| Area of opening ($S_{out}$) | [mm²] | 2827.4 |
| Position of air ejection port |  | entire circumference of side surface portion (rear) |
| Area of air ejection port ($S_{in}$) | [mm²] | 801.6 |
| D/L | [—] | 0.50 |
| $S_{in}/S_{out}$ | [—] | 0.284 |

The analysis results are shown in Table 6.

TABLE 6

| Maximum value of ejection speed | [m/s] | 3.65 |
|---|---|---|
| Minimum value of ejection speed | [m/s] | 0.71 |
| Standard deviation of ejection speed |  | 0.62 |
| Speed of air colliding with camera wall surface | [m/s] | 2.15 |

As shown in Table 6, the ejection speed showed a positive value, there was no air flowing into the camera housing, the speed of the air colliding with the wall of the camera was 10 m/s or less, and it was understood that there was no vibration of the camera. Furthermore, as compared with (1-a) of Example 1, the maximum value of the ejection speed and the minimum value of the ejection speed became larger, and it was understood that a faster ejected air was formed.

Example 3

As shown in FIG. 5, with respect to the third embodiment of the present invention, the speed distribution of the ejected air at the opening of the camera housing having a configuration, in which the air ejection port was provided over the entire circumference of the side portion of the camera housing at a position of the side portion closer to the opening side than the lens surface of the camera lens, was analyzed. Except for the position of the air ejection port, it was the same as in Example 2.

Details of the analysis conditions are summarized in Table 7.

TABLE 7

| Diameter of inscribed circle of front portion (L) | [mm] | 120.0 |
|---|---|---|
| Diameter of inscribed circle of opening (D) | [mm] | 60.0 |
| Area of opening ($S_{out}$) | [mm²] | 2827.4 |
| Position of air ejection port |  | entire circumference of side surface portion (front) |
| Area of air ejection port ($S_{in}$) | [mm²] | 801.6 |
| D/L | [—] | 0.50 |
| $S_{in}/S_{out}$ | [—] | 0.284 |

The analysis results are shown in Table 8.

TABLE 8

|  |  | (2 - b) |
|---|---|---|
| Maximum value of ejection speed | [m/s] | 3.32 |
| Minimum value of ejection speed | [m/s] | 0.72 |
| Standard deviation of ejection speed |  | 0.51 |
| Speed of air colliding with camera wall surface | [m/s] | 2.09 |

As shown in Table 8, the ejection speed showed a positive value, there was no air flowing into the camera housing, the speed of the air colliding with the wall of the camera was 10 m/s or less, and it was understood that there was no vibration of the camera.

Comparative Example

As Comparative Example, with respect to the camera housing which did not satisfy that "the diameter of the inscribed circle of the opening is 0.9 time or less the diameter of the inscribed circle of the front portion of the camera housing, and the area of the air ejection port provided in the wall of the camera housing is 0.1 time or more the area of the opening", the speed distribution of the ejected air at the opening was analyzed, and one example is shown.

Details of the analysis conditions of the camera housing having been analyzed are summarized in Table 9.

TABLE 9

|  |  | (A) | (B) | (C) | (D) | (E) |
|---|---|---|---|---|---|---|
| Diameter of inscribed circle of front portion (L) | [mm] | 120.0 | 120.0 | 120.0 | 120.0 | 120.0 |
| Diameter of inscribed circle of opening (D) | [mm] | 110.0 | 110.0 | 110.0 | 60.0 | 60.0 |
| Area of opening ($S_{out}$) | [mm²] | 9503.3 | 9503.3 | 9503.3 | 2827.4 | 2827.4 |
| Position of air ejection port | [—] | rear portion (optical axis: center) | rear portion (optical axis: center) | rear portion (optical axis: shifted) | rear portion (optical axis: center) | rear portion (optical axis: shifted) |
| Area of air ejection port ($S_{in}$) | [mm²] | 3217.0 | 201.1 | 201.1 | 201.1 | 201.1 |
| D/L | [—] | 0.92 | 0.92 | 0.92 | 0.50 | 0.50 |
| $S_{in}/S_{out}$ | [—] | 0.339 | 0.021 | 0.021 | 0.071 | 0.071 |

The analysis results are shown in Table 10.

TABLE 10

|  |  | (A) | (B) | (C) | (D) | (E) |
|---|---|---|---|---|---|---|
| Maximum value of ejection speed | [m/s] | 1.44 | 1.75 | 31.41 | 3.29 | 4.23 |
| Minimum value of ejection speed | [m/s] | −0.261 | 0.237 | −1.942 | 0.483 | −0.422 |
| Standard deviation of ejection speed |  | 0.41 | 0.32 | 5.38 | 0.53 | 1.36 |
| Speed of air colliding with camera wall surface | [m/s] | 3.42 | 36.16 | 12.74 | 36.16 | 12.74 |

As a result, in (A), (C) and (E), the ejection speed showed a negative value in the camera housing where the diameter of the inscribed circle of the opening exceeded 0.9 with respect to the diameter of the inscribed circle of the front portion of the camera housing, and it was found that a flow flowing into the camera housing occurred. Further, in (B) and (D), in the camera housing where the area of the air ejection port was less than 0.1 with respect to the area of the opening, because air colliding with the rear portion of the camera at about 40 m/s was generated, it was found that vibration of the camera occurred.

Examples 1 to 3 and Comparative Examples are summarized in Table 11.

TABLE 11

|  | Example 1 (1 - a) | Example 2 | Example 3 | Comparative Example |
|---|---|---|---|---|
| Minimum value of ejection speed | 3 | 2 | 1 | — |
| Standard deviation of ejection speed | 2 | 2 | 1 | — |
| Maximum value of ejection speed | 2 | 1 | 3 | — |
| Total evaluation (performance) | C | B | A | D |

In order of performance, the evaluation was carried out with four stages of A, B, C and D. Here, the minimum value of the ejection speed, the standard deviation of the ejection speed and the maximum value of the ejection speed were ranked respectively, and let D be the one which did not satisfy the performance such as occurrence of inflow of mist from the opening or the camera device vibration occurred. In addition, with respect to Example 1, in order to make comparison under the same condition, (1-a), where the diameter of the inscribed circle of the opening and the area of the air ejection port were almost the same as in Examples 2 and 3, was compared.

From these results, it was confirmed that the vibration of the camera device due to the ejected air did not occur, and the oil mist did not adhere to the camera lens surface even during long-term use, and clear images could be secured at a state unchanged from immediately after the installation of the camera device.

Figure 7:
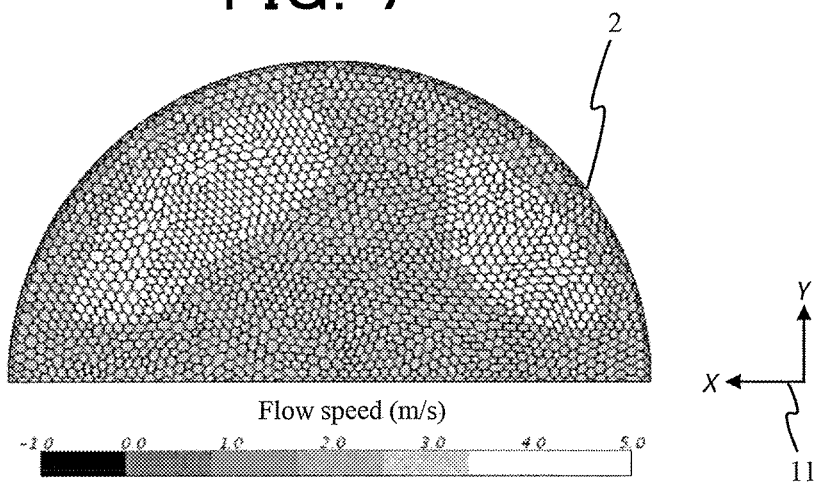
FIG. 7 is a distribution chart of an ejection speed at an opening of Example 1 (1-a).
Figure 8:
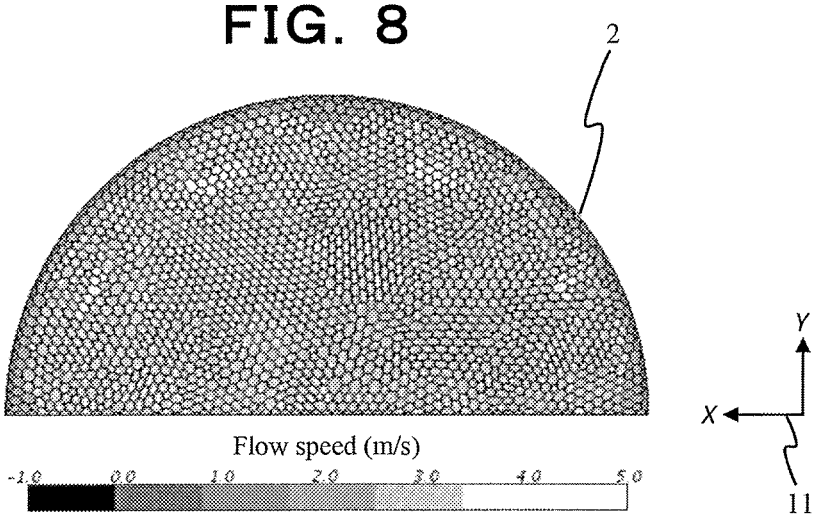
FIG. 8 is a distribution chart of an ejection speed at an opening of Example 3.
Figure 9:
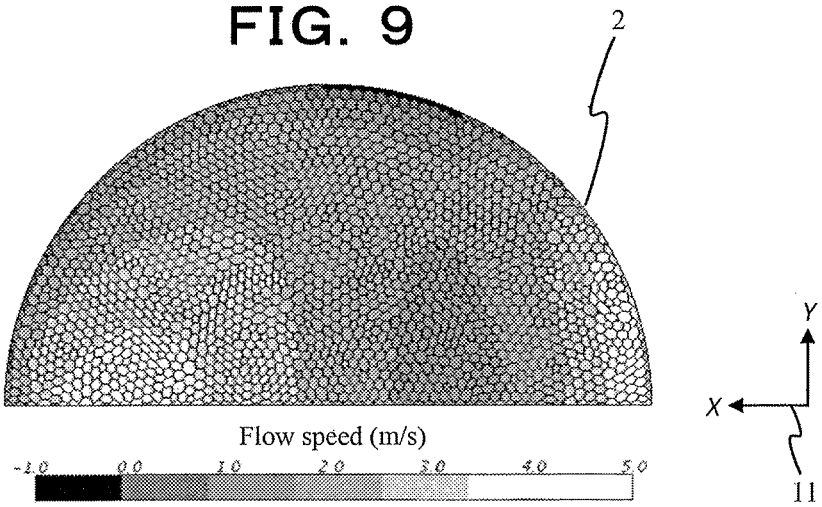
FIG. 9 is a distribution chart of an ejection speed at an opening of Comparative Example (E).

FIG. 7 shows the speed distribution at the opening of Example 1 (1-a), FIG. 8 shows the speed distribution at the opening of Example 3, and FIG. 9 shows the speed distribution at the opening of Comparative Example (E). In any case, the flow speed at the opening is indicated by gray value of the image, and the lighter and whiter it is, the higher the flow speed is. Further, in order to shorten the analysis time, it is the result of analyzing only one side half of the circular opening, and the boundary forming the diameter of the opening is a symmetrical boundary. It was found that all the results of Example 1 (1-a) and Example 3 had a positive flow speed distribution. Furthermore, as compared with Example 1 (1-a), it was found that in Example 3, a more uniform flow speed distribution was obtained. In the speed distribution shown in Comparative Example (E), a negative flow speed occurred in a part along the circumference of the opening, and it was found that a flow flowing into the camera housing existed.

The present invention can be applied to the adhesion prevention of dust and mist, but its application is not limited thereto.

EXPLANATION OF SYMBOLS

1: camera housing
2: opening
3: air ejection port
3a: air at air ejection port
3b: air at opening
4: camera
5: camera lens
6: focal point
7: optical axis
8: angle of view
9: fixing jig
10: cable
11: coordinate system
12: inscribed circle of front portion of camera housing
13: diameter of inscribed circle of front portion of camera housing
14: diameter of inscribed circle of opening
15: area formed by angle of view

The invention claimed is:

1. An imaging method with a camera device provided inside of a camera housing, wherein the camera housing comprises:

a front portion provided at a position opposite of a lens surface of an internally provided camera lens, wherein the front portion has an opening;

a rear portion provided at a position opposite of the front portion; and a side portion, wherein the side portion has an air ejection port provided over the entire circumference of the side portion, wherein a diameter of an inscribed circle of the opening is 0.9 time or less of a diameter of an inscribed circle of the front portion, the air ejection port comprises a slit having a width of 8 to 18 mm, an area of the air ejection port is 0.1 time or more an area of the opening, and the air ejection port is provided closer to the opening than the lens surface of the camera lens, the method comprising imaging while ejecting air into the camera housing from outside of the camera housing through the air ejection port, wherein the flow speed of air colliding with the camera device or an inner wall surface of the camera housing is controlled at 10 m/s or less.

* * * * *